Nov. 20, 1928. 1,692,303
P. P. HORNI
LENS
Filed March 21, 1927
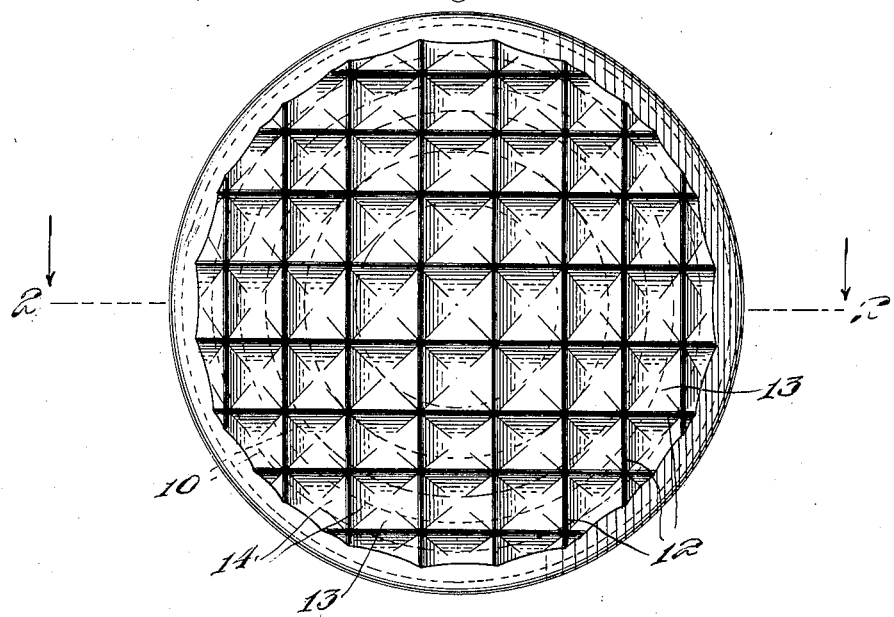
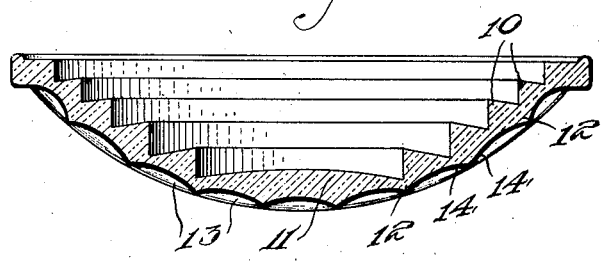
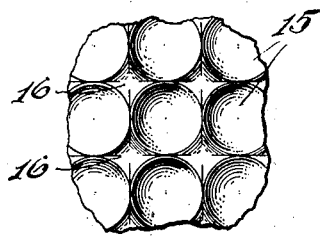
INVENTOR
Paul P. Horni
BY
Knight Bros.
ATTORNEYS Patented Nov. 20, 1928.

1,692,303

UNITED STATES PATENT OFFICE.

PAUL P. HORNI, OF NEWARK, NEW JERSEY.

LENS.

Application filed March 21, 1927. Serial No. 177,126.

This invention relates to an improved lens that is particularly adapted for signal purposes, being used principally in signaling lights such as are used in traffic control lights, street beacons and similar situations where it is necessary to prevent glare in a driver's eyes and to project the rays from the lamps behind the lens so as to make them visible over a considerable area laterally with the object of attracting the attention of drivers though they be on the edge of the road and also when used in an elevated position to have it noticeable even though the driver has approached to a point nearly under the signal.

The lens provides a wide diffusion of light as the lens distributes small beams of light in intersecting directions so that the lens has the appearance of a luminous body rather than of a sharply defined glaring light and at the same time it is a prominent signal for relatively long distances.

The invention is illustrated in the accompanying drawings in which

Figure 1 is a face view of the convex side of a lens embodying one form of the invention.

Figure 2 is a section on line 2—2 in Figure 1, and

Figure 3 is a fragment of a face of a modified form of lens.

The lens is usually made of generally concavo-convex form with its concave face provided with a series of prismatic annular ridges 10 except for the center which is usually provided with the bull's-eye 11. The concave side of the lens has the effect of concentrating the light from a lamp at its focus into a projecting beam. The outer or convex face is provided with a series of retiform ribs 12, these ribs being usually rectangular relative to each other so as to form square depressions 13, although it will be evident that other than square depressions can be formed by other geometrical arrangement of the ribs. The walls of the ribs are concave, as shown at 14, so that the depressions have the general cross section of truncated pyramids, these pyramidal shaped hollow or recessed portions being for convenience in the average size of lens about three-quarters of an inch to an inch square, although larger or smaller sizes can be used when desired. Each depression approximates the lenticular form so that the parts of the beam of light, concentrated by the concave part of the lens that passes thru the lenticular spaces, will be redirected in a number of smaller rays so as to cross each other at various angles and distribute some of the light over a wider range. In addition, the small lenticular facets give a scintillating effect that makes the light strikingly perceptive without any strong glare. The lens appear itself as a bright object.

A modification is shown in Figure 3 in which the depressions at 15 are round and the spaces 16 between the round depressions are provided with concave sides to form with the walls of the recess 15, a prism to project the ray from the light in various directions. With this form of lens, it can be looked into even with a strong light behind it at a close distance without any blinding effect on the observer, and at the same time is markedly prominent to the eye when viewed from the distance and equally attractive when viewed at a sharp angle from the side or, in fact, any point sharply tangent to the convex face of the lens. Instead of the lenticular facets being concave, it is obvious that they may equally well be convex and produce the same disseminating effect.

I claim:—

A concavo-convex lens, the concave side having a central bull's-eye, and concentric prismatic ribs cooperating with the bull's-eye to concentrate a beam of light passing through the lens, and the convex side having its whole face covered with lenticular subdivisions whereby the beam formed by the concave side is subdivided into a number of small intersecting beams disposed both vertically and horizontally.

PAUL P. HORNI.